US009328632B2

(12) United States Patent
Nagai et al.

(10) Patent No.: US 9,328,632 B2
(45) Date of Patent: May 3, 2016

(54) RANKINE CYCLE

(75) Inventors: Hiroyuki Nagai, Machida (JP);
Tomohiko Saitou, Sagamihara (JP);
Takayuki Ishikawa, Yokohama (JP);
Shinichiro Mizoguchi, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 283 days.

(21) Appl. No.: 14/342,876

(22) PCT Filed: Aug. 14, 2012

(86) PCT No.: PCT/JP2012/070656
§ 371 (c)(1),
(2), (4) Date: Mar. 5, 2014

(87) PCT Pub. No.: WO2013/046970
PCT Pub. Date: Apr. 4, 2013

(65) Prior Publication Data
US 2014/0208754 A1    Jul. 31, 2014

(30) Foreign Application Priority Data

Sep. 30, 2011    (JP) .................................. 2011-216787

(51) Int. Cl.
| | |
|---|---|
| *F01K 23/10* | (2006.01) |
| *F01K 25/08* | (2006.01) |
| *F02G 5/04* | (2006.01) |
| *F01K 23/06* | (2006.01) |
| *F01K 23/14* | (2006.01) |
| *F01K 25/10* | (2006.01) |
| *F01N 5/02* | (2006.01) |

(52) U.S. Cl.
CPC .............. *F01K 23/10* (2013.01); *F01K 23/065* (2013.01); *F01K 23/14* (2013.01); *F01K 25/10* (2013.01);

(Continued)

(58) Field of Classification Search
CPC ....... F01K 23/10; F01K 25/10; F01K 23/065; F01K 23/14; F02G 5/04; F02G 2260/00; Y02T 10/166; F01N 5/02
USPC .................... 60/614, 616, 618, 655, 651, 671
See application file for complete search history.

(56) References Cited

U.S. PATENT DOCUMENTS

| | | | |
|---|---|---|---|
| 5,000,003 A | 3/1991 | Wicks | |
| 8,544,270 B2 * | 10/2013 | Kasuya | ................... F01K 13/02 60/618 |

(Continued)

FOREIGN PATENT DOCUMENTS

| | | |
|---|---|---|
| EP | 2 320 058 A1 | 5/2011 |
| EP | 2 336 537 A1 | 6/2011 |

(Continued)

*Primary Examiner* — Hoang Nguyen
(74) *Attorney, Agent, or Firm* — Drinker Biddle & Reath LLP

(57) ABSTRACT

A Rankine cycle includes an waste-heat recovery device that is configured to exchange heat between cooling water coming out from an engine and exhaust gas exhausted from the engine, a heat exchanger including an evaporator through which the cooling water coming out from the engine flows to recover waste-heat of the engine to refrigerant, and a superheater through which the cooling water coming out from the waste-heat recovery device flows to recover the waste-heat of the engine to the refrigerant, an expander that is configured to generate power using the refrigerant coming out from the heat exchanger, a condenser that is configured to condense the refrigerant coming out from the expander, and a refrigerant pump that is configured to supply the refrigerant coming out from the condenser to the heat exchanger by being driven by the expander. The cooling water coming out from the superheater is returned to the engine after being joined with the cooling water coming out from the evaporator.

6 Claims, 14 Drawing Sheets

(52) U.S. Cl.
 CPC ... *F02G 5/04* (2013.01); *F01N 5/02* (2013.01); *F02G 2260/00* (2013.01); *Y02T 10/166* (2013.01)

(56) References Cited

U.S. PATENT DOCUMENTS 8,881,523 B2 * 11/2014 Kasuya .................. F01K 13/02
 60/618

2010/0307155 A1 * 12/2010 Kasuya .................. F01K 23/065
 60/666
2014/0174087 A1 * 6/2014 Mizoguchi ............ F01K 23/065
 60/670

FOREIGN PATENT DOCUMENTS

| JP | 2010-077964 A | 4/2010 |
| JP | 2010-096147 A | 4/2010 |
| WO | WO-2009/101977 A1 | 8/2009 |

* cited by examiner

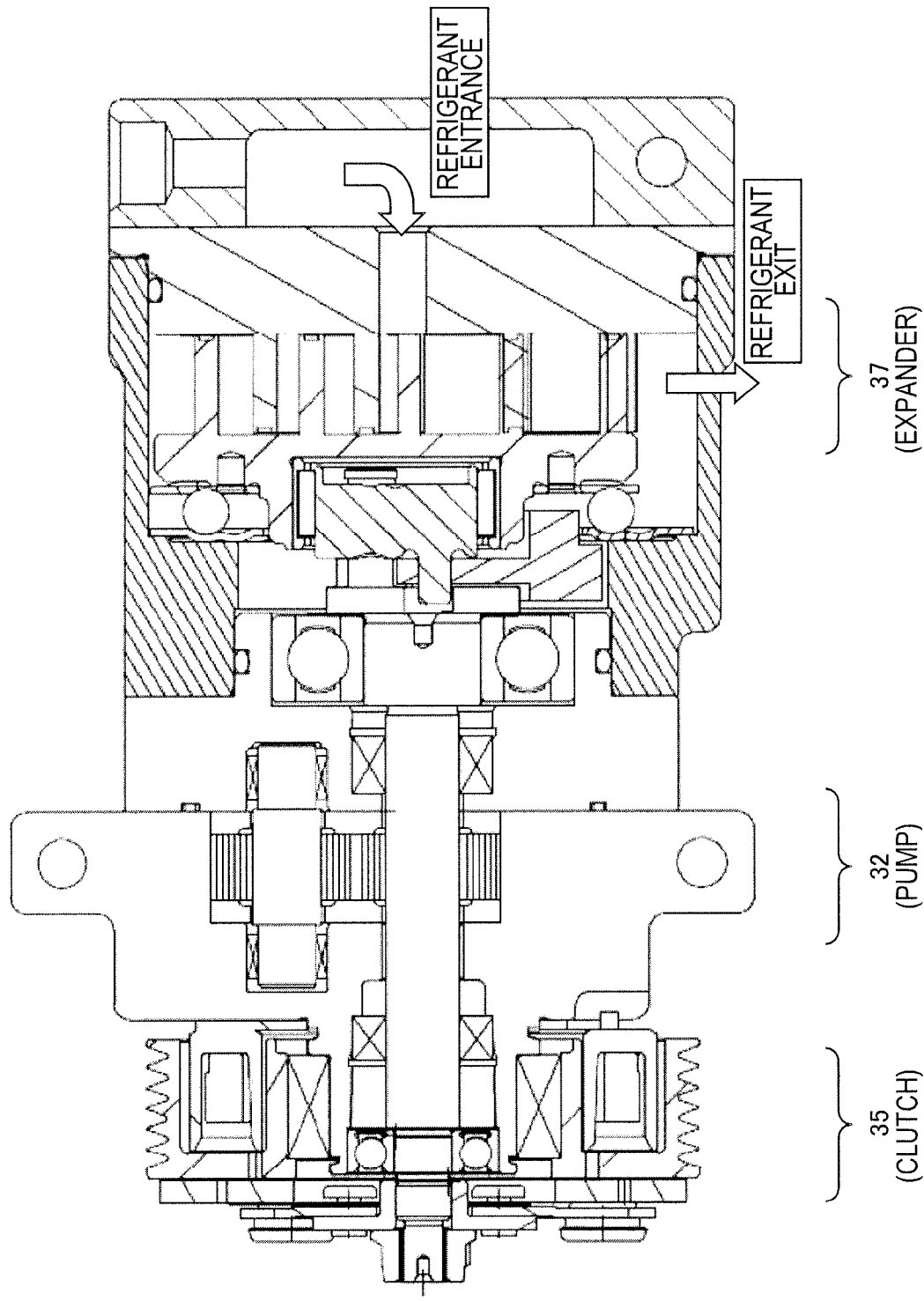

RANKINE CYCLE

TECHNICAL FIELD

The present invention relates to a Rankine cycle.

BACKGROUND ART

A Rankine cycle of JP2010-77964A issued in 2010 by the Japan Patent Office includes an evaporator for evaporating refrigerant using cooling water at the exit of an engine, an waste-heat recovery device for heating the cooling water at the exit of the engine using exhaust gas and a superheater for overheating gas refrigerant using the cooling water at the exit of the waste-heat recovery device.

SUMMARY OF INVENTION

Since the Rankine cycle of JP2010-77964A is so configured that the cooling water at the exit of the superheater is returned to the entrance of the waste-heat recovery device, a pressure difference between the entrance and exit of the waste-heat recovery device is small. As a result, an amount of the cooling water flowing through the waste-heat recovery device has been small.

The present invention was developed, focusing on such a conventional problem. An object of the present invention is to provide a Rankine cycle in which a sufficient amount of cooling water can flow into an waste-heat recovery device.

A Rankine cycle according to one aspect of the present invention includes an waste-heat recovery device that is configured to exchange heat between cooling water coming out from an engine and exhaust gas exhausted from the engine, a heat exchanger including an evaporator through which the cooling water coming out from the engine flows to recover waste-heat of the engine to refrigerant, and a superheater through which the cooling water coming out from the waste-heat recovery device flows to recover the waste-heat of the engine to the refrigerant, an expander that is configured to generate power using the refrigerant coming out from the heat exchanger, a condenser that is configured to condense the refrigerant coming out from the expander, and a refrigerant pump that is configured to supply the refrigerant coming out from the condenser to the heat exchanger by being driven by the expander. The cooling water coming out from the superheater is returned to the engine after being joined with the cooling water coming out from the evaporator.

Embodiments of the present invention and advantages thereof are described in detail below with reference to the accompanying drawings.

BRIEF DESCRIPTION OF DRAWINGS

FIG. 2A is a schematic sectional view of an expander pump formed by uniting a pump and an expander.

DESCRIPTION OF EMBODIMENTS

Figure 1:
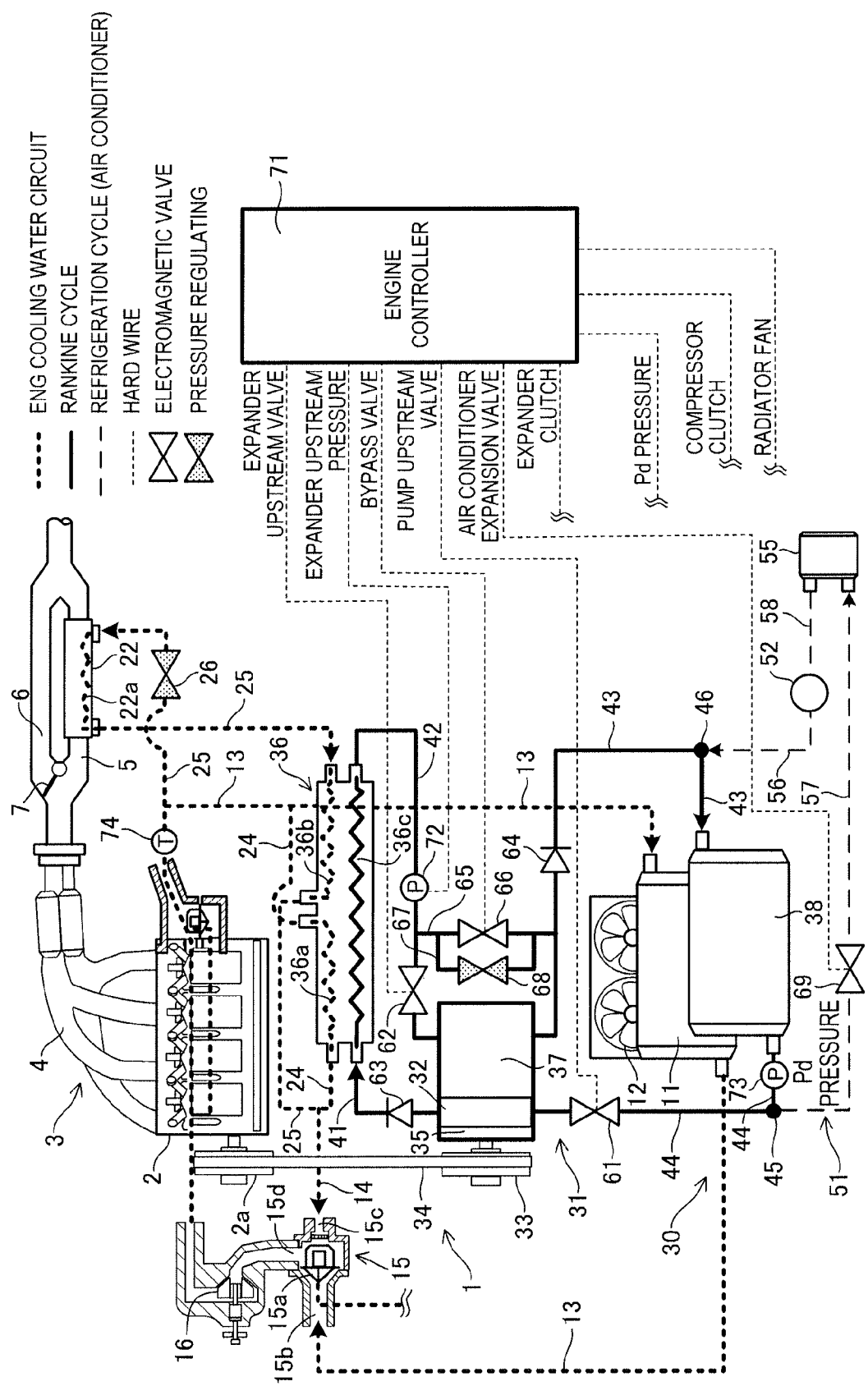
FIG. 1 is a schematic configuration diagram showing an entire system of a Rankine cycle of an embodiment of the present invention.

FIG. 1 is a schematic configuration diagram showing an entire system of a Rankine cycle of an embodiment of the present invention.

A Rankine cycle 31 and a refrigeration cycle 51 of FIG. 1 share refrigerant and a condenser 38. A cycle obtained by integrating the Rankine cycle 31 and the refrigeration cycle 51 is referred to as an integrated cycle 30 hereinafter. The integrated cycle 30 indicates an entire system including passages and the like for cooling water and exhaust gas in addition to passages in which the refrigerant of the Rankine cycle 31 and the refrigeration cycle 51 is circulated and constituent elements such as pumps, expanders and condensers provided at intermediate positions of the passages.

Figure 4:
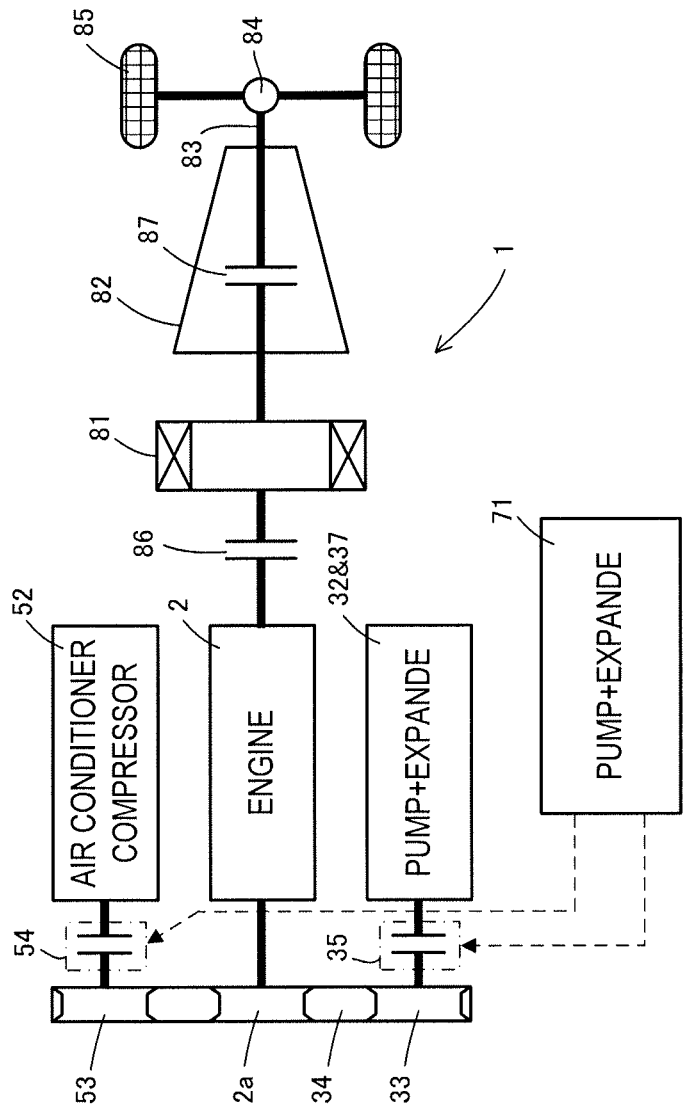
FIG. 4 is a schematic configuration diagram of a hybrid vehicle.

FIG. 4 is a schematic configuration diagram of a hybrid vehicle 1 in which the integrated cycle 30 is mounted.

In the hybrid vehicle 1, an engine 2, a motor generator 81 and an automatic transmission 82 are coupled in series. An output of the automatic transmission 82 is transmitted to drive wheels 85 via a propeller shaft 83 and a differential gear 84. A first drive shaft clutch 86 is provided between the engine 2 and the motor generator 81. Further, a second drive shaft clutch 87 is provided in the automatic transmission 82. This second drive shaft clutch 87 is one of frictional engagement elements of the automatic transmission 82.

Connection and disconnection (connected states) of the first and second drive shaft clutches 86, 87 are controlled by a command of an engine controller 71 according to a driving condition of the hybrid vehicle. When the hybrid vehicle 1 is in an EV running region where the efficiency of the engine 2 is poor as shown in FIG. 7B, a stop is made, the first drive shaft clutch 86 is disconnected and the second drive shaft clutch 87 is connected, whereby the hybrid vehicle 1 runs only with a drive force of the motor generator 81.

When an engine rotation speed increases and a transition is made to a Rankine cycle operating region, the Rankine cycle 31 (to be described later) is operated by operating the engine 2.

Figure 6:
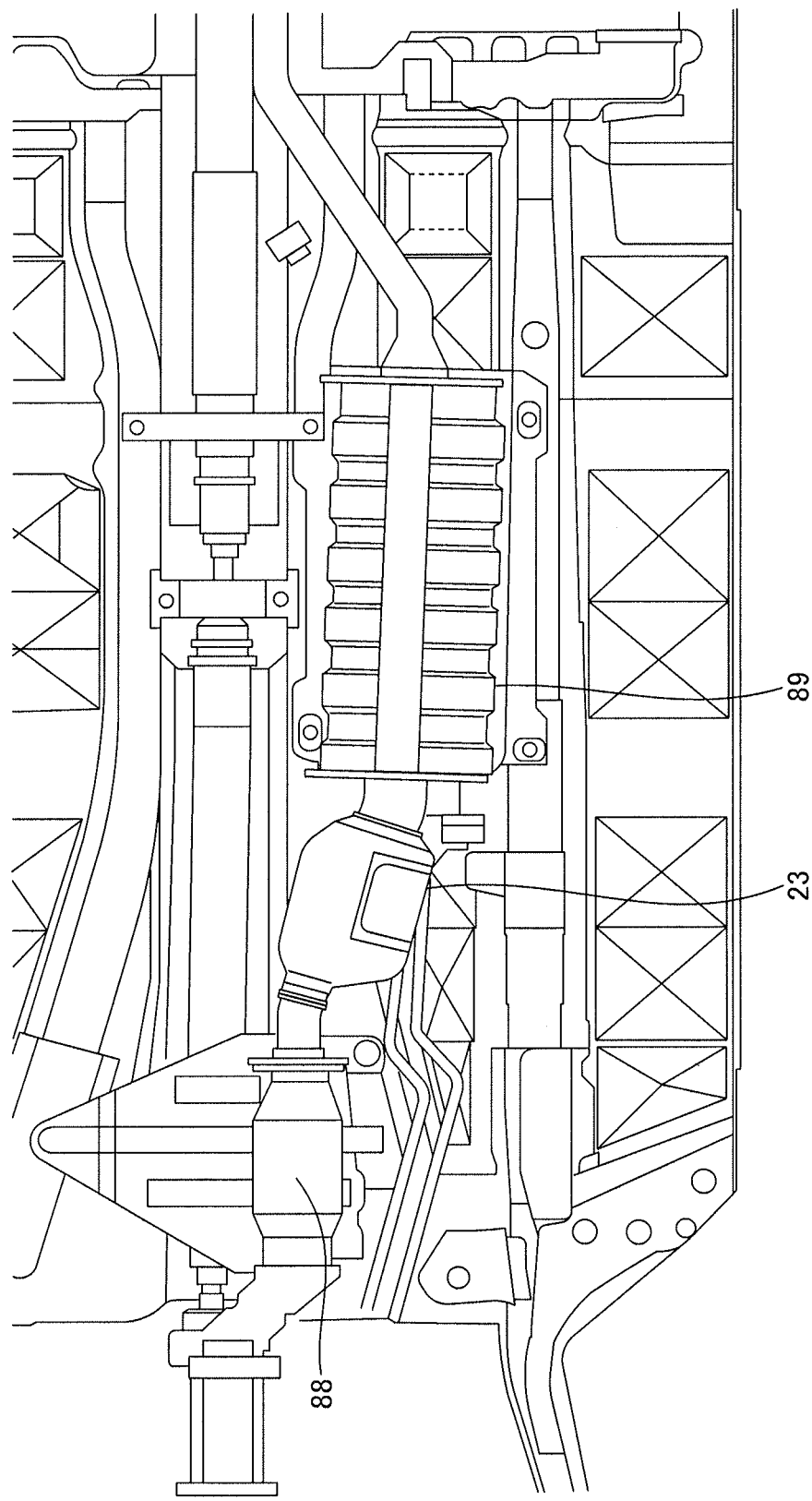
FIG. 6 is a schematic diagram of the engine when viewed from below.

As shown in FIG. 1, an exhaust passage 3 of the engine 2 includes an exhaust manifold 4, an exhaust pipe 5 and a bypass exhaust pipe 6. The exhaust pipe 5 is connected to a collection part of the exhaust manifold 4. The bypass exhaust pipe 6 is branched off at an intermediate position of the exhaust pipe 5 and joins the exhaust pipe 5 again. An waste-heat recovery device 22 is provided in a section of the exhaust pipe 5 bypassed by the bypass exhaust pipe 6. The waste-heat recovery device 22 performs heat exchange between exhaust gas and cooling water. A unit obtained by uniting the waste-heat recovery device 22 and the bypass exhaust pipe 6 is called an waste-heat recovery unit 23. As shown in FIG. 6, the waste-heat recovery unit 23 is arranged between an under-floor catalyst 88 and a sub-muffler 89.

Next, an engine cooling water passage is described based on FIG. 1. The engine cooling water passage includes a cooling water passage 13 passing through a radiator 11 and a bypass cooling water passage 14 bypassing the radiator 11. The bypass cooling water passage 14 includes a first bypass cooling water passage 24 and a second bypass cooling water passage 25. The first bypass cooling water passage 24 is branched off from the cooling water passage 13 and directly connected to a heat exchanger 36 to be described later. The second bypass cooling water passage 25 is branched off from the cooling water passage 13 and connected to the heat exchanger 36 by way of the waste-heat recovery device 22.

Next, the flow of engine cooling water is described based on FIG. 1. Cooling water coming out from the engine 2 has a temperature of about 80 to 90° C. The cooling water separately flows in the cooling water passage 13 and the bypass cooling water passage 14. Thereafter, two flows join again in a thermostat valve 15. The thermostat valve 15 is a three-way valve for controlling a flow rate of the cooling water supplied to the radiator 11 according to a cooling water temperature. The thermostat valve 15 is so structured that a valve main body 15a is built in a housing formed with two inlet ports (inlet ports 15b, 15c) and one outlet port 15d. The cooling water passage 13 is connected to the inlet port 15b. The cooling water passage 14 is connected to the inlet port 15c. The thermostat valve 15 increases and decreases the flow rate of the cooling water supplied to the radiator 11 according to the cooling water temperature. In this way, the thermostat valve 15 determines an allocation of flow rates of the cooling water flowing in the cooling water passage 13 and the bypass cooling water passage 14. As a result, the cooling water temperature is properly maintained. The cooling water joined in the thermostat valve 15 is returned to the engine 2 by way of a cooling water pump 16. The cooling water pump 16 is driven by the engine 2. A rotation speed of the cooling water pump 16 is synchronized with the engine rotation speed. The thermostat valve 15 relatively increases an amount of the cooling water passing through the radiator 11 by increasing a valve opening on the side of the cooling water passage 13 when a cooling water temperature is high. Further, the thermostat valve 15 relatively decreases the amount of the cooling water passing through the radiator 11 by reducing the valve opening on the side of the cooling water passage 13 when the cooling water temperature is low. When the cooling water temperature is particularly low such as before the warm-up of the engine 2, the thermostat valve 15 is fully closed on the side of the cooling water passage 13. As a result, the cooling water completely bypasses the radiator 11 and a total amount of the cooling water flows in the bypass cooling water passage 14.

It should be noted that the thermostat valve 15 is configured not to be completely closed on the side of the bypass cooling water passage 14. Thus, even if the flow rate of the cooling water flowing through the radiator 11 increases, the flow of the cooling water flowing in the bypass cooling water passage 14 is not completely stopped.

Next, the heat exchanger 36 is described. The heat exchanger 36 performs heat exchange between the refrigerant of the Rankine cycle 31 and the cooling water. The heat exchanger 36 is formed by integrating a heater and a superheater. Specifically, in the heat exchanger 36, cooling water passages 36a, 36b are provided substantially in a row and adjacent to a refrigerant passage 36c of the Rankine cycle 31. Due to such a configuration, the refrigerant and the cooling water can exchange heat. Further, the cooling water passages 36a and 36b and the refrigerant passage 36c are so configured that the refrigerant of the Rankine cycle 31 and the cooling water flow in mutually opposite directions.

In detail, the cooling water passage 36a located on an upstream side (left side of FIG. 1) of the refrigerant of the Rankine cycle 31 is inserted in the first bypass cooling water passage 24. The cooling water coming out from the engine 2 is introduced to a heat exchanger left part formed by the cooling water passage 36a and a refrigerant passage part adjacent to this cooling water passage 36a. This part serves as a heater for heating the refrigerant flowing in the refrigerant passage 36c.

The cooling water having passed through the waste-heat recovery device 22 via the second bypass cooling water passage 25 is introduced to the cooling water passage 36b located on a downstream side (right side of FIG. 1) of the refrigerant of the Rankine cycle 31. The cooling water coming out from the engine 2 and heated by exhaust gas is introduced to a heat exchanger right part (downstream side for the refrigerant of the Rankine cycle 31) formed by the cooling water passage 36b and a refrigerant passage part adjacent to this cooling water passage 36b. This part serves as a superheater for overheating the refrigerant flowing in the refrigerant passage 36c.

A cooling water passage 22a of the waste-heat recovery device 22 is provided adjacent to the exhaust pipe 5. The cooling water coming out from the engine 2 and introduced to the cooling water passage 22a of the waste-heat recovery device 22 is heated, for example, up to 110 to 115° C. by the high-temperature exhaust gas. It should be noted that the cooling water passage 22a is so configured that the exhaust gas and the cooling water flow in mutually opposite directions.

A control valve 26 is disposed in the second bypass cooling water passage 25. Further, a cooling water temperature sensor 74 is provided at the exit of the engine 2. An opening of this control valve 26 is reduced when a temperature detected by the cooling water temperature sensor 74 reaches a predetermined value or higher so that an engine water temperature does not exceed a permissible temperature (e.g. 100° C.) for preventing, for example, efficiency deterioration of the engine and the occurrence of knocking. When the engine water temperature approaches the permissible temperature, an amount of the cooling water passing through the waste-heat recovery device 22 is reduced. This can reliably prevent the engine water temperature from exceeding the permissible temperature.

On the other hand, if the cooling water temperature increased in the waste-heat recovery device 22 becomes too high and the cooling water evaporates (boils) due to a reduction in the flow rate of the second bypass cooling water passage 25, efficiency in the heat exchanger 36 drops. Further, the flow of the cooling water in the cooling water passage may become poor and component temperatures may excessively increase. To avoid this, a thermostat valve 7 for controlling an amount of the exhaust gas passing through the waste-heat recovery device 22 and an amount of the exhaust gas passing through the bypass exhaust pipe 6 is provided in a branched part of the bypass exhaust pipe 6. A valve opening of the thermostat valve 7 is adjusted based on the temperature of the cooling water coming out from the waste-heat recovery device 22 so that the temperature of the cooling water coming out from the waste-heat recovery device 22 does not exceed a predetermined temperature (e.g. boiling temperature of 120°).

The heat exchanger 36, the thermostat valve 7 and the waste-heat recovery device 22 are united into the waste-heat recovery unit 23 and arranged at intermediate positions of the exhaust pipe under a substantially central part of a floor in a vehicle width direction. A relatively simple temperature sensitive valve using a bimetal or the like may be used as the thermostat valve 7. Further, a control valve controlled by a controller to which a temperature sensor output is input may be used as the thermostat valve 7. Since an adjustment of a heat exchange amount from the exhaust gas into the cooling water by the thermostat valve 7 is associated with a relatively long delay, it is difficult to prevent the engine water temperature from exceeding the permissible temperature if the thermostat valve 7 is singly adjusted. However, since the control valve 26 in the second bypass cooling water passage 25 is controlled based on the engine water temperature (exit temperature), a heat recovery amount can be quickly reduced to reliably prevent the engine water temperature from exceeding the permissible temperature. Further, if there is a margin between the engine water temperature and the permissible temperature, an waste-heat recovery amount can be increased by performing heat exchange until the temperature of the cooling water coming out from the waste-heat recovery device 22 reaches a high temperature (e.g. 110 to 115° C.) exceeding the permissible temperature of the engine water temperature. The cooling water coming out from the cooling water passage 36b joins the first bypass cooling water passage 24 via the second bypass cooling water passage 25.

If the temperature of the cooling water is sufficiently reduced, the valve opening on the side of the cooling water passage 13 is reduced and the amount of the cooling water passing through the radiator 11 is relatively reduced. The temperature of the cooling water is sufficiently reduced, for example, because the temperature of the refrigerant of the Rankine cycle 31 is low and heat is thought to be exchanged with this refrigerant. If the temperature of the cooling water is increased, the valve opening on the side of the cooling water passage 13 is increased and the amount of the cooling water passing through the radiator 11 is relatively increased. The temperature of the cooling water is increased, for example, because the Rankine cycle 31 is not operated. Based on such an operation of the thermostat valve 15, the cooling water temperature of the engine 2 is maintained at a suitable temperature and heat is appropriately supplied (recovered) to the Rankine cycle 31.

Next, the integrated cycle 30 is described. The integrated cycle 30 is formed by integrating the Rankine cycle 31 and the refrigeration cycle 51 as described above. The Rankine cycle 31 as a basis is first described and the refrigeration cycle 51 is then described below.

The Rankine cycle 31 is a system for recovering the waste-heat of the engine 2 to the refrigerant through the cooling water of the engine 2 and regenerating the recovered waste-heat as power. The Rankine cycle 31 includes a refrigerant pump 32, the heat exchanger 36 as a superheater, an expander 37 and the condenser 38. These are connected by refrigerant passages 41 to 44 in which the refrigerant (R134a, etc.) is circulated.

Figure 2B:
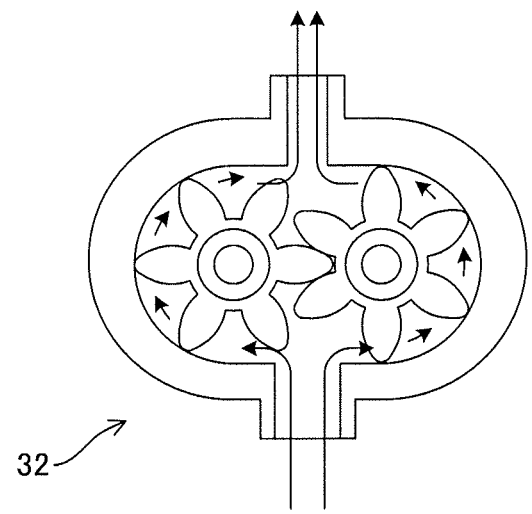
FIG. 2B is a schematic sectional view of a refrigerant pump.
Figure 2C:
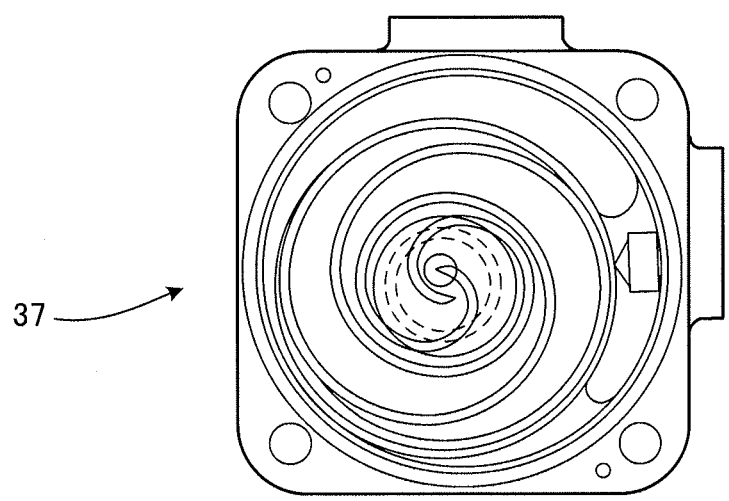
FIG. 2C is a schematic sectional view of the expander.

A shaft of the refrigerant pump 32 is arranged to be coupled to an output shaft of the expander 37 on the same axis (see FIG. 2A). The shaft of the refrigerant pump 32 and the output shaft of the expander 37 are arranged in parallel with an output shaft of the engine 2. A belt 34 is mounted between a pump pulley 33 provided on the tip of the shaft of the refrigerant pump 32 and a crank pulley 2a (see FIG. 1). Due to such a configuration, an output (power) generated by the expander 37 drives the refrigerant pump 32 and drives the output shaft (crankshaft) of the engine 2. It should be noted that the refrigerant pump 32 of the present embodiment is a gear-type pump as shown in FIG. 2B. The expander 37 is a scroll type expander as shown in FIG. 2C.

Further, an electromagnetic clutch (hereinafter, this clutch is referred to as an "expander clutch") 35 is provided between the pump pulley 33 and the refrigerant pump 32. Due to such a configuration, the refrigerant pump 32 and the expander 37 are connectable to and disconnectable from the engine 2 (see FIG. 2A). If the expander clutch 35 is connected when the output generated by the expander 37 exceeds a drive force of the refrigerant pump 32 and the friction of a rotating body and there is surplus power (when a predicted expander torque is positive), the rotation of the engine output shaft can be assisted by the surplus power of the expander 37. By assisting the rotation of the engine output shaft using energy obtained by waste-heat recovery in this way, fuel economy can be improved. Further, energy for driving the refrigerant pump 32 for circulating the refrigerant can also be generated using the recovered waste-heat.

The refrigerant from the refrigerant pump 32 is supplied to the heat exchanger 36 via the refrigerant passage 41. The heat exchanger 36 is a heat exchanger for performing heat exchange between the cooling water of the engine 2 and the refrigerant and evaporating and overheating the refrigerant.

The refrigerant from the heat exchanger 36 is supplied to the expander 37 via the refrigerant passage 42. The expander 37 is a steam turbine for converting heat into rotational energy by expanding the evaporated and overheated refrigerant. The power recovered by the expander 37 drives the refrigerant pump 32 and is transmitted to the engine 2 via a belt transmission mechanism to assist the rotation of the engine 2.

The refrigerant from the expander 37 is supplied to the condenser 38 via the refrigerant passage 43. The condenser 38 is a heat exchanger for performing heat exchange between outside air and the refrigerant and cooling and liquefying the refrigerant. The condenser 38 is arranged in parallel with the radiator 11 and cooled by a radiator fan 12.

The refrigerant liquefied by the condenser 38 is returned to the refrigerant pump 32 via the refrigerant passage 44. The refrigerant returned to the refrigerant pump 32 is fed to the heat exchanger 36 again by the refrigerant pump 32 and is circulated through each constituent element of the Rankine cycle 31.

Next, the refrigeration cycle 51 is described. Since the refrigeration cycle 51 shares the refrigerant circulating in the Rankine cycle 31, the refrigeration cycle 51 is integrated with the Rankine cycle 31 and the configuration thereof is simple. The refrigeration cycle 51 includes a compressor 52, the condenser 38 and an evaporator 55.

The compressor 52 is a fluid machine for compressing the refrigerant of the refrigeration cycle 51 at high temperature and high pressure. The compressor 52 is driven by the engine 2. As shown in FIG. 4, a compressor pulley 53 is fixed to a drive shaft of the compressor 52. The belt 34 is mounted on this compressor pulley 53 and the crank pulley 2a. A drive force of the engine 2 is transmitted to the compressor pulley 53 via this belt 34 to drive the compressor 52. Further, an electromagnetic clutch (hereinafter, this clutch is referred to as a "compressor clutch") 54 is provided between the compressor pulley 53 and the compressor 52. Due to such a configuration, the compressor 52 and the compressor pulley 53 are connectable to and disconnectable from each other.

Referring back to FIG. 1, the refrigerant from the compressor 52 is supplied to the condenser 38 after joining the refrigerant passage 43 via a refrigerant passage 56. The condenser 38 is a heat exchanger for condensing and liquefying the refrigerant by heat exchange with outside air. The liquid refrigerant from the condenser 38 is supplied to the evaporator 55 via a refrigerant passage 57 branched off from the refrigerant passage 44. The evaporator 55 is arranged in a case of an air conditioner unit in the same manner as a heater core. The evaporator 55 is a heat exchanger for evaporating the liquid refrigerant from the condenser 38 and cooling air conditioning air from a blower fan by latent heat of evaporation at that time.

The refrigerant evaporated by the evaporator 55 is returned to the compressor 52 via a refrigerant passage 58. It should be noted that a mixing ratio of the air conditioning air cooled by the evaporator 55 and that heated by the heater core is changed according to an opening of an air mix door to adjust the temperature to a temperature set by a passenger.

The integrated cycle 30 is composed of the Rankine cycle 31 and the refrigeration cycle 51 as described above. Various valves are provided at intermediate positions of the integrated cycle 30 to control the refrigerant flowing in the cycle. For example, to control the refrigerant circulating in the Rankine cycle 31, a pump upstream valve 61 is provided in the refrigerant passage 44 allowing communication between a refrigeration cycle junction 45 and the refrigerant pump 32 and an expander upstream valve 62 is provided in the refrigerant passage 42 allowing communication between the heat exchanger 36 and the expander 37. Further, a check valve 63 for preventing a reverse flow of the refrigerant from the heat exchanger 36 to the refrigerant pump 32 is provided in the refrigerant passage 41 allowing communication between the refrigerant pump 32 and the heat exchanger 36. A check valve 64 for preventing a reverse flow of the refrigerant from a refrigeration cycle junction 46 to the expander 37 is provided in the refrigerant passage 43 allowing communication between the expander 37 and the refrigeration cycle junction 46. Further, an expander bypass passage 65 is provided which bypasses the expander 37 from a side upstream of the expander upstream valve 62 and joins at a side upstream of the check valve 64, and a bypass valve 66 is provided in this expander bypass passage 65. Furthermore, a pressure regulating valve 68 is provided in a passage 67 bypassing the bypass valve 66. In the refrigeration cycle 51, an air conditioner expansion valve 69 is provided in the refrigerant passage 57 connecting the refrigeration cycle junction 45 and the evaporator 55.

Any of the pump upstream valve 61, the expander upstream valve 62, the bypass valve 66 and the air conditioner expansion valve 69 is an electromagnetic on-off valve. To the engine controller 71 are input a signal indicating an expander upstream pressure detected by a pressure sensor 72, a signal indicating a refrigerant pressure Pd at the exit of the condenser 38 detected by a pressure sensor 73, a rotation speed signal of the expander 37, etc. In the engine controller 71, the compressor 52 of the refrigeration cycle 51 and the radiator fan 12 are controlled and the opening and closing of the pump upstream valve 61, the expander upstream valve 62, the bypass valve 66 and the air conditioner expansion valve 69 are controlled based on each of these input signals according to a predetermined driving condition.

For example, an expander torque (regenerative power) is predicted based on the expander upstream pressure detected by the pressure sensor 72 and the expander rotation speed, and the expander clutch 35 is engaged when this predicted expander torque is positive (the rotation of the engine output shaft can be assisted) and released when the predicted expander torque is zero or negative. Prediction based on the sensor detected pressure and the expander rotation speed has higher accuracy than that based on the exhaust temperature. Thus, the expander clutch 35 can be properly engaged/released according to a generation state of the expander torque (for further details, see JP2010-190185A).

Figure 3:
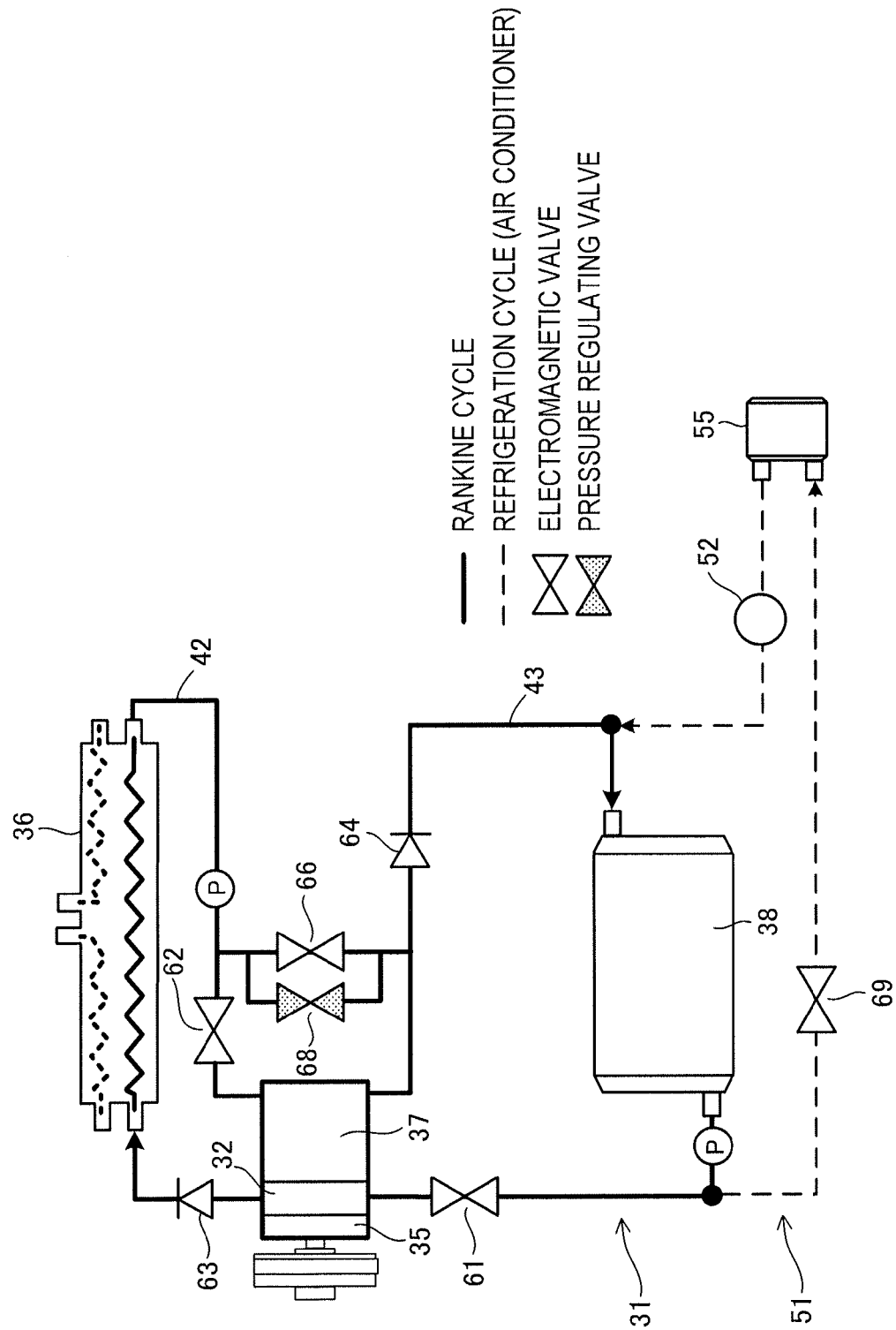
FIG. 3 is a schematic diagram showing functions of refrigerant system valves.

The above four on-off valves (pump upstream valve 61, expander upstream valve 62, bypass valve 66, air conditioner expansion valve 69) and two check valves (check valves 63, 64) are refrigerant system valves. Functions of these refrigerant system valves are shown anew in FIG. 3.

The pump upstream valve 61 prevents an uneven distribution of the refrigerant (containing a lubricant component) to the Rankine cycle 31 by being closed under a predetermined condition that makes the refrigerant easily unevenly distributed to the Rankine cycle 31 as compared with the refrigeration cycle 51. The pump upstream valve 61 closes the Rankine cycle 31 in cooperation with the check valve 64 downstream of the expander 37 as described later. The expander upstream valve 62 cuts off the refrigerant passage 42 to maintain the refrigerant from the heat exchanger 36 until a high pressure is reached when a refrigerant pressure from the heat exchanger 36 is relatively low. This can prompt the heating of the refrigerant even if the expander torque cannot be sufficiently obtained and can shorten, for example, a time until the Rankine cycle 31 is restarted, i.e. a time until regeneration actually becomes possible. The bypass valve 66 shortens a start-up time of the Rankine cycle 31 by being opened to actuate the refrigerant pump 32 after the expander 37 is bypassed such as when an amount of the refrigerant present on the side of the Rankine cycle 31 is insufficient such as at the start-up of the Rankine cycle 31. If a state where the refrigerant temperature at the exit of the condenser 38 or at the entrance of the refrigerant pump 32 is reduced from a boiling point in consideration of a pressure at that location by a predetermined temperature difference (subcool temperature SC) or more is realized by actuating the refrigerant pump 32 after the expander 37 is bypassed, a state is prepared where the liquid refrigerant can be sufficiently supplied to the Rankine cycle 31.

The check valve 63 upstream of the heat exchanger 36 maintains the refrigerant supplied to the expander 37 at a high pressure in cooperation with the bypass valve 66, the pressure regulating valve 68 and the expander upstream valve 62. Under a condition that regeneration efficiency of the Rankine cycle 31 is low, the operation of the Rankine cycle 31 is stopped and the refrigerant pressure during the stop is increased by closing a section before and after the heat exchanger 36, so that the Rankine cycle 31 can be quickly restarted utilizing the high-pressure refrigerant. The pressure regulating valve 68 functions as a relief valve for allowing the refrigerant having reached an excessively high pressure to escape by being opened when the pressure of the refrigerant supplied to the expander 37 becomes excessively high.

The check valve 64 downstream of the expander 37 prevents an uneven distribution of the refrigerant to the Rankine cycle 31 in cooperation with the aforementioned pump upstream valve 61. If the engine 2 is not warm yet immediately after the operation of the hybrid vehicle 1 is started, the temperature of the Rankine cycle 31 is lower than that of the refrigeration cycle 51 and the refrigerant may be unevenly distributed toward the Rankine cycle 31. A probability of uneven distribution toward the Rankine cycle 31 is not very high. However, since it is desired to quickly cool vehicle interior, for example, immediately after the start of the vehicle operation in summer, cooling capacity is required most. In such a situation, it is desired to ensure the refrigerant of the refrigeration cycle 51 by resolving even a slightly uneven distribution of the refrigerant. Accordingly, the check valve 64 is provided to prevent the uneven distribution of the refrigerant toward the Rankine cycle 31.

The compressor 52 is not so structured that the refrigerant can freely pass when the drive is stopped. The compressor 52 can prevent an uneven distribution of the refrigerant to the refrigeration cycle 51 in cooperation with the air conditioner expansion valve 69. This is described. When the operation of the refrigeration cycle 51 is stopped, the refrigerant moves from the side of the Rankine cycle 31 that is in steady operation and has a relatively high temperature to the side of the refrigeration cycle 51, whereby the refrigerant circulating in the Rankine cycle 31 may become insufficient. In the refrigeration cycle 51, the temperature of the evaporator 55 is low immediately after the cooling is stopped and the refrigerant tends to stay in the evaporator 55 that has a relatively large volume and a low temperature. In this case, the uneven distribution of the refrigerant to the refrigeration cycle 51 can be prevented by stopping the drive of the compressor 52 to block a movement of the refrigerant from the condenser 38 to the evaporator 55 and closing the air conditioner expansion valve 69.

Figure 5:
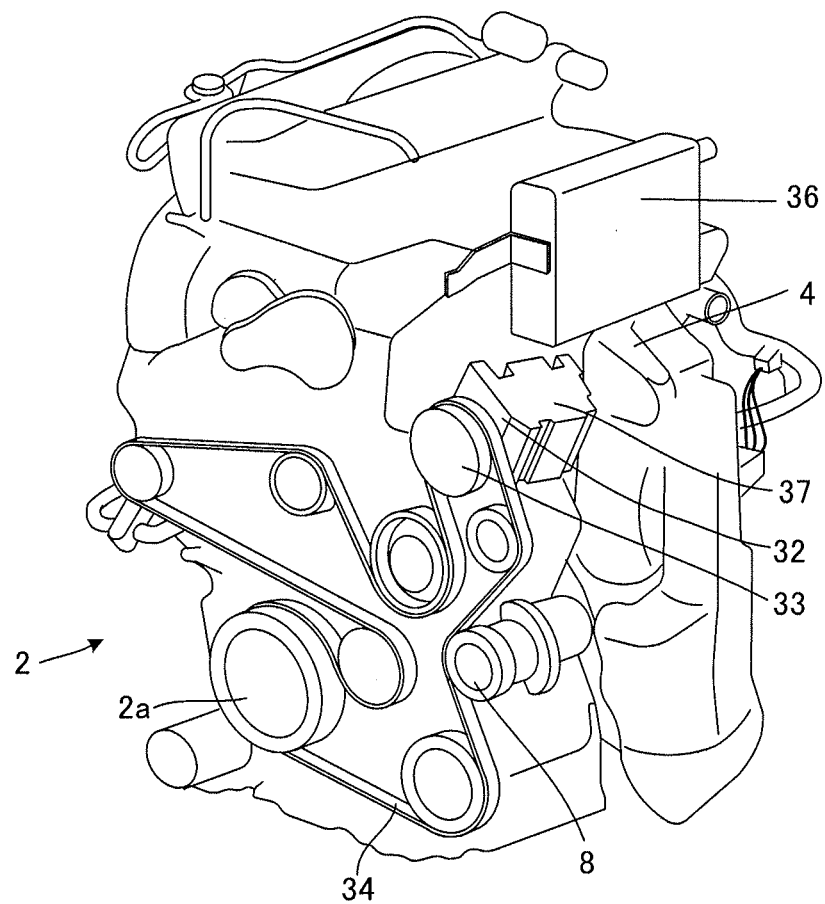
FIG. 5 is a schematic perspective view of an engine.

Next, FIG. 5 is a schematic perspective view of the engine 2 showing an entire package of the engine 2. What is characteristic in FIG. 5 is that the heat exchanger 36 is arranged vertically above the exhaust manifold 4. By arranging the heat exchanger 36 in a space vertically above the exhaust manifold 4, the mountability of the Rankine cycle 31 on the engine 2 is improved. Further, a tension pulley 8 is provided on the engine 2.

Next, a basic operation method of the Rankine cycle 31 is described with reference to FIGS. 7A and 7B.

Figure 7A:
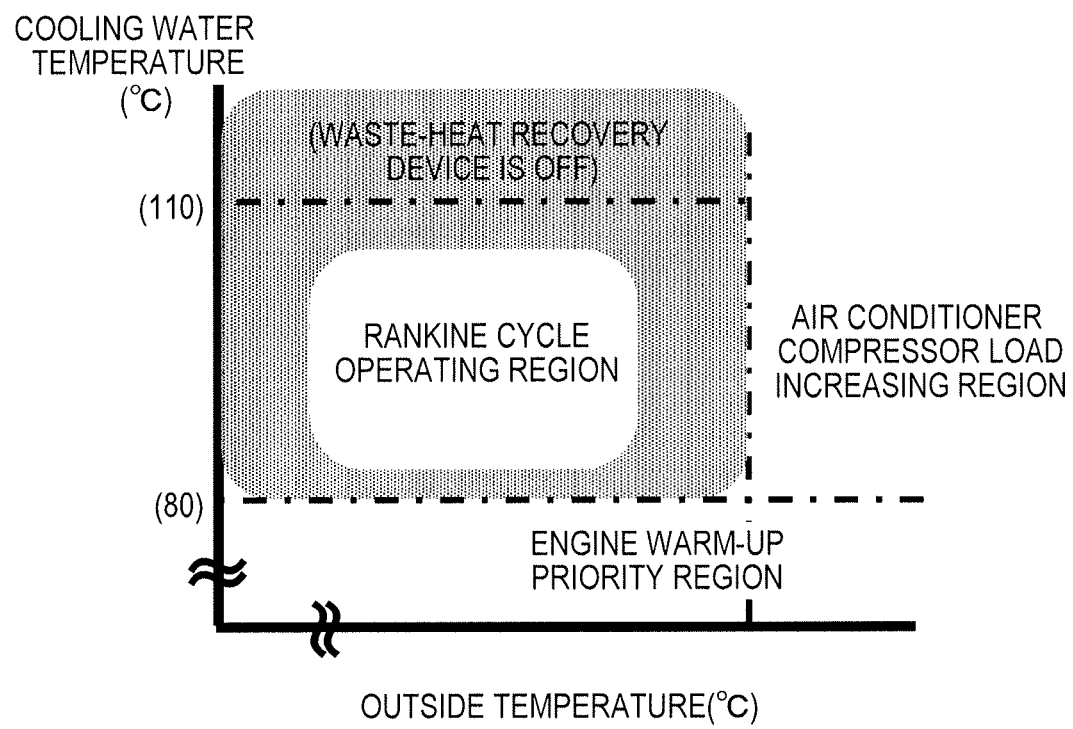
FIG. 7A is a characteristic graph of a Rankine cycle operating region.
Figure 7B:
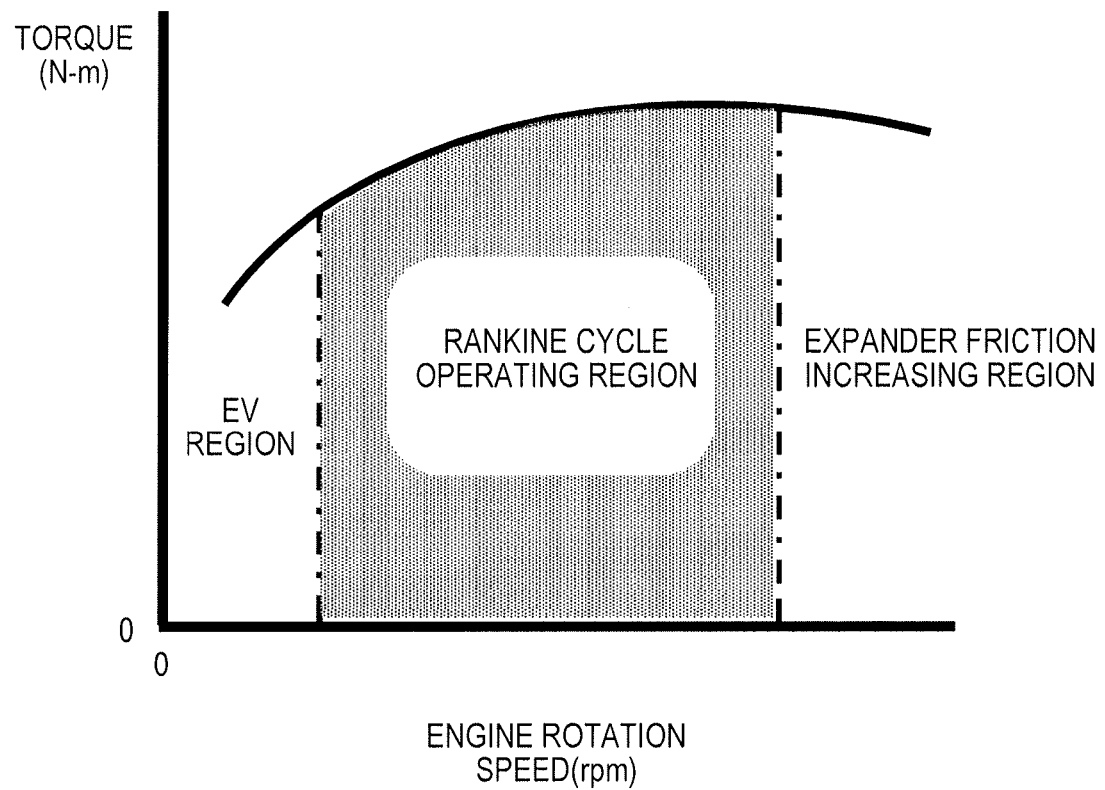
FIG. 7B is a characteristic graph of a Rankine cycle operating region.

First, FIGS. 7A and 7B are graphs showing operating regions of the Rankine cycle 31. A horizontal axis of FIG. 7A represents outside air temperature and a vertical axis represents engine water temperature (cooling water temperature). A horizontal axis of FIG. 7B represents engine rotation speed and a vertical axis represents engine torque (engine load).

The Rankine cycle 31 is operated when both conditions of FIGS. 7A and 7B are satisfied. In FIG. 7A, the operation of the Rankine cycle 31 is stopped in a region on a low water temperature side where the warm-up of the engine 2 is prioritized and a region on a high outside temperature side where a load of the compressor 52 increases. During a warm-up period in which exhaust temperature is low and recovery efficiency is poor, the cooling water temperature is quickly increased rather by not operating the Rankine cycle 31. During a high outside temperature period in which high cooling capacity is required, the Rankine cycle 31 is stopped to provide the refrigeration cycle 51 with sufficient refrigerant and the cooling capacity of the condenser 38. In FIG. 7B, the operation of the Rankine cycle 31 is stopped in the EV running region and a region on a high rotation speed side where the friction of the expander 37 increases since the vehicle is the hybrid vehicle 1. Since it is difficult to provide the expander 37 with a highly efficient structure having little friction at all the rotation speeds, the expander 37 is so configured (dimensions and the like of each part of the expander 37 are set) in the case of FIG. 7B as to realize small friction and high efficiency in an engine rotation speed region where an operation frequency is high.

Figure 8:
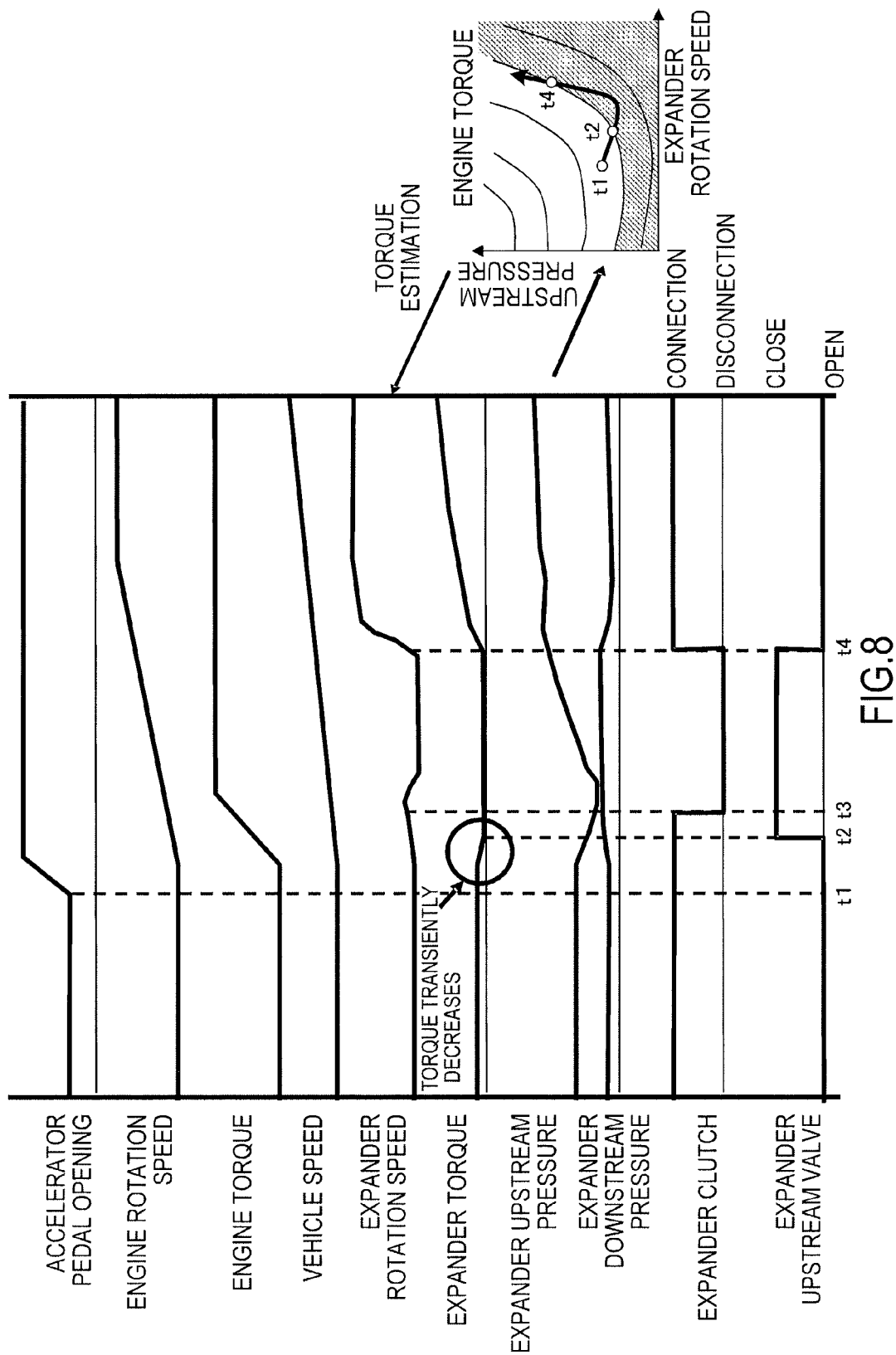
FIG. 8 is a timing chart showing a state where the hybrid vehicle is accelerated while the rotation of an engine output shaft is assisted by an expander torque.

FIG. 8 is a timing chart showing, by modeling, a state where the hybrid vehicle 1 is accelerated while the rotation of the engine output shaft is assisted by the expander torque. It should be noted that a transition of an operating state of the expander 37 at this time is shown on an expander torque map on the right side of FIG. 8. The expander torque tends to become highest in ranges (left upper ranges) where the expander rotation speed is low and the expander upstream pressure is high out of ranges separated by contour lines of the expander torque map. The expander torque tends to become smaller with an increase in the expander rotation speed and a reduction in the expander upstream pressure (toward a right lower side). Particularly, hatched ranges are an area where the expander torque is negative and becomes a load for the engine on the assumption that the refrigerant pump is driven.

Until t1 at which a driver depresses an accelerator pedal, steady speed running is continued, the expander 37 generates a positive torque and the rotation of the engine output shaft is assisted by the expander torque.

After t1, an increase in the exhaust temperature or the cooling water temperature is delayed with respect to an increase in the engine rotation speed while the rotation speed of the expander 37, i.e. the rotation speed of the refrigerant pump 32 increases in proportion to the engine rotation speed. Thus, a ratio of a recoverable heat amount to an amount of the refrigerant increased by an increase in the rotation speed of the refrigerant pump 32 decreases.

Accordingly, with an increase in the expander rotation speed, the refrigerant pressure upstream of the expander decreases and the expander torque decreases.

If the expander torque is no longer sufficiently obtained due to this reduction in the expander torque (e.g. at timing t2 at which the expander torque becomes nearly zero), deterioration in regeneration efficiency is avoided by switching the expander upstream valve 62 from an open state to a closed state. Specifically, a phenomenon in which the expander 37 is, on the contrary, dragged by the engine 2 with an excessive reduction in the expander torque is avoided.

After the expander upstream valve 62 is switched from the open state to the closed state, the expander clutch 35 is switched from a connected state (engaged state) to a disconnected state (released state) at timing t3. The refrigerant pressure upstream of the expander is sufficiently reduced by somewhat delaying this disconnection timing of the expander clutch 35 from a timing at which the expander upstream valve 62 is switched from the open state to the closed state. This prevents the expander 37 from being excessively rotated when the expander clutch 35 is disconnected. Further, a relatively large amount of the refrigerant is supplied into the heat exchanger 36 by the refrigerant pump 32 and the refrigerant is effectively heated also during the stop of the Rankine cycle 31, whereby the operation of the Rankine cycle 31 can be smoothly resumed.

After t3, the expander upstream pressure increases again due to an increase in a heat radiation amount of the engine 2. At timing t4, the expander upstream valve 62 is switched from the closed state to the open state and the supply of the refrigerant to the expander 37 is resumed. Further, the expander clutch 35 is connected again at t4. By this reconnection of the expander clutch 35, the rotation assist of the engine output shaft by the expander torque is resumed.

Figure 9:
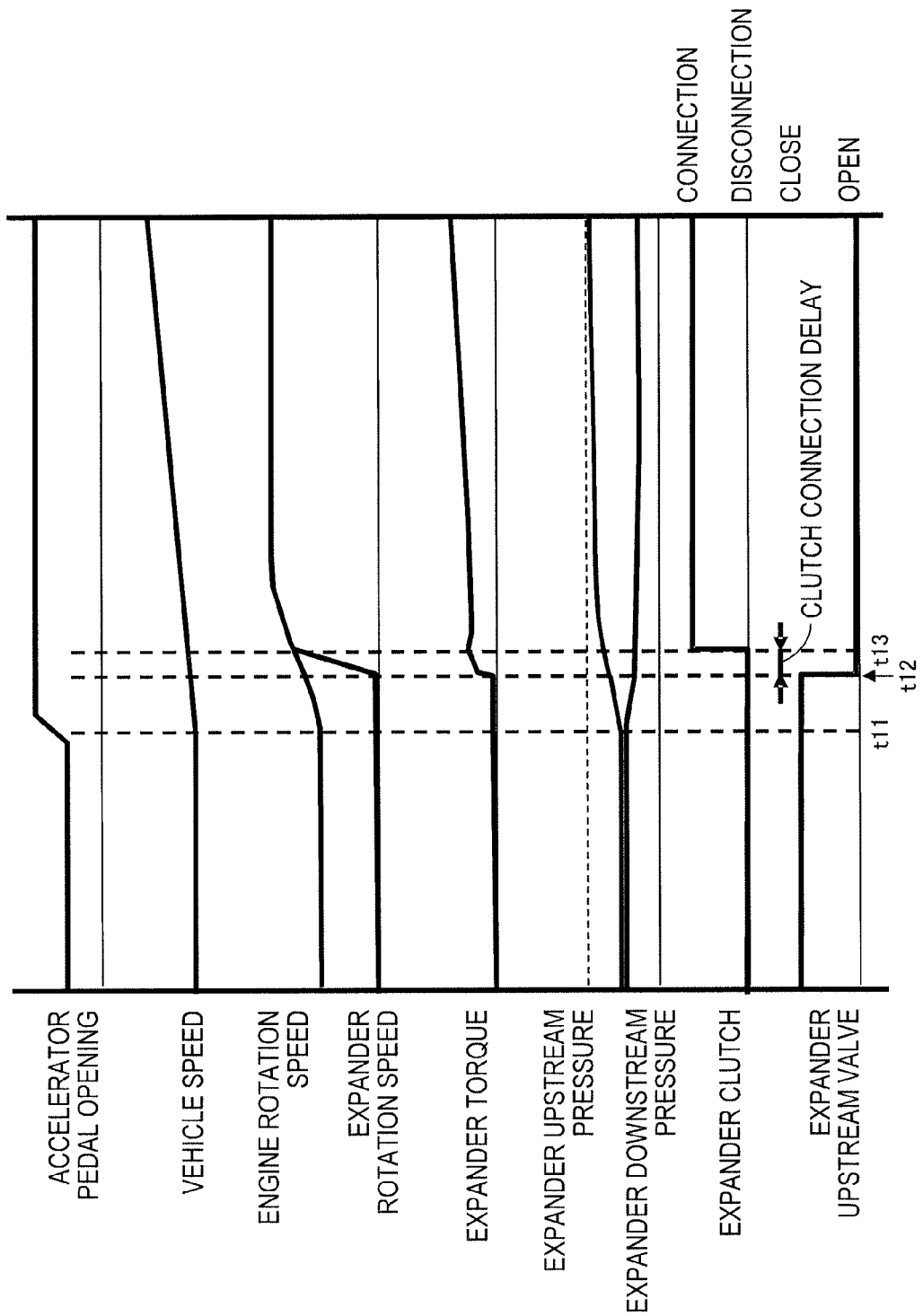
FIG. 9 is a timing chart showing a state where a restart is made after the operation of the Rankine cycle is stopped.

FIG. 9 is a timing chart showing, by modeling, a state where the Rankine cycle 31 is restarted in a manner different from that in FIG. 8 (control at t4) after the operation of the Rankine cycle is stopped with the expander upstream valve 62 closed and the expander clutch 35 disconnected.

An accelerator pedal opening increases when the driver depresses the accelerator pedal at timing t11. At t11, the Rankine cycle 31 is not operated. Thus, the expander torque is kept zero.

The heat radiation amount of the engine 2 increases with an increase in the engine rotation speed from t11, and the temperature of the cooling water flowing into the heat exchanger 36 increases and the temperature of the refrigerant in the heat exchanger 36 increases due to this increase in the heat radiation amount. Since the expander upstream valve 62 is closed, the refrigerant pressure upstream of the expander upstream valve 62, i.e. the expander upstream pressure increases (t11 to t12) due to this increase in the refrigerant temperature by the heat exchanger 36.

A switch is made from a Rankine cycle non-operating region to the Rankine cycle operating region by this change in the operating state. If the expander upstream valve 62 is not provided and the expander clutch 35 is immediately switched from the disconnected state to the connected state to couple the expander 37 to the engine output shaft when a transition is made to the Rankine cycle operating region, the expander 37 becomes a load for the engine 2 and, in addition, a torque shock occurs.

On the other hand, in FIG. 9, the expander upstream valve 62 is not immediately switched from the closed state to the open state when a switch is made to the Rankine cycle operating region. Specifically, the expander upstream valve 62 is kept closed even after a transition is made to the Rankine cycle operating region.

Eventually, a differential pressure between the expander upstream pressure and an expander downstream pressure increases, it is judged that the expander 37 can be operated (driven) at timing t12 at which the differential pressure reaches a predetermined pressure or higher, and the expander upstream valve 62 is switched from the closed state to the open state. By this switch of the expander upstream valve 62 to the open state, the refrigerant of a predetermined pressure is supplied to the expander 37 and the expander rotation speed quickly increases from zero.

The expander clutch 35 is switched from the disconnected state to the connected state at timing t13 at which the expander rotation speed reaches the engine rotation speed due to this increase in the expander rotation speed. If the expander clutch 35 is connected before the rotation speed of the expander 37 is sufficiently increased, the expander 37 becomes an engine load and a torque shock possibly occurs. Contrary to this, by connecting the expander clutch 35 with a delay at t13 at which there is no rotation speed difference from the rotation speed of the engine output shaft, it can be prevented that the expander 37 becomes an engine load and a torque shock occurs in association with the engagement of the expander clutch 35.

Figure 10:
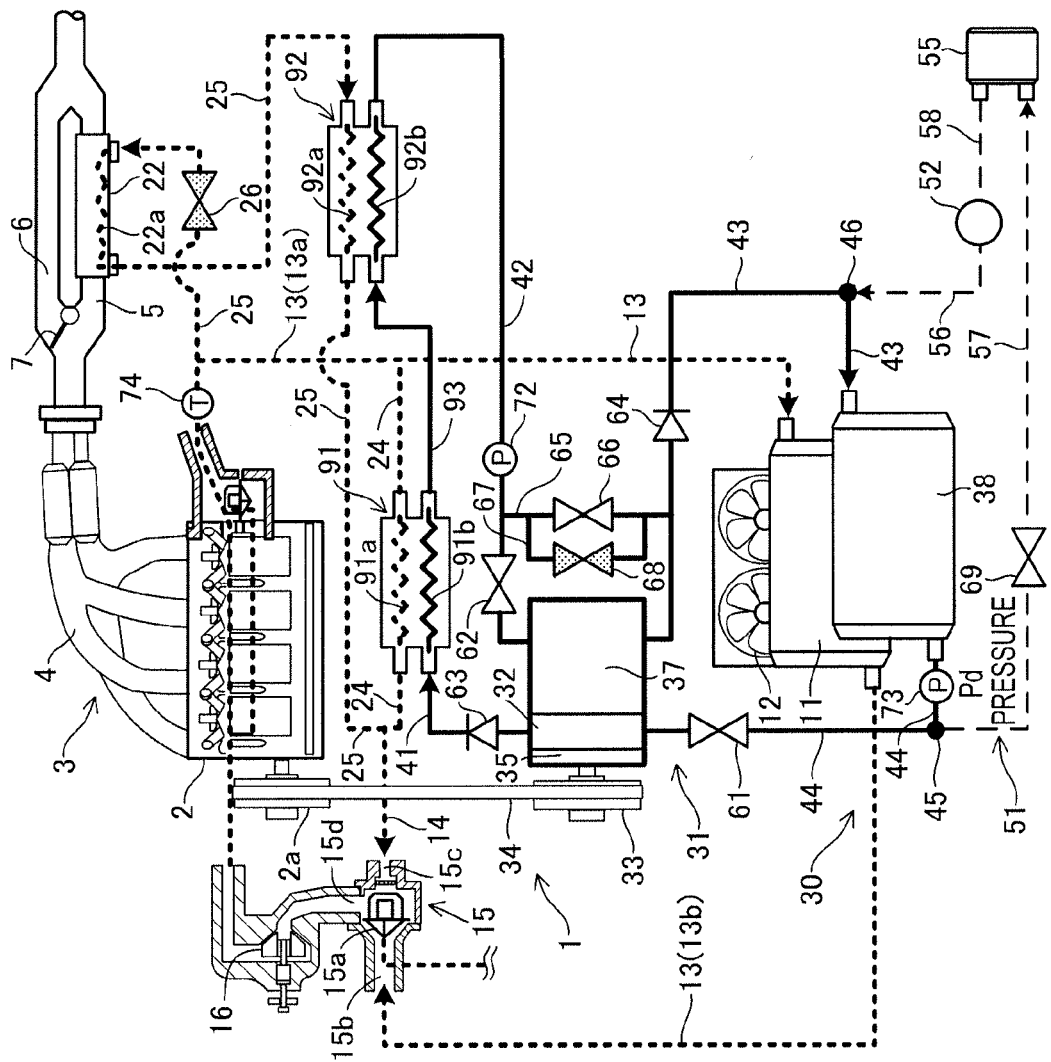
FIG. 10 is a schematic configuration diagram showing an entire system of a Rankine cycle of an embodiment having a configuration different from that of FIG. 1.

FIG. 10 is a schematic configuration diagram showing an entire system of a Rankine cycle of an embodiment having a configuration partly different from that of FIG. 1. It should be noted that the same components as in FIG. 1 are denoted by the same reference signs.

A cooling water passage 13 passes through a radiator 11. The cooling water passage 13 includes a first cooling water passage 13a and a second cooling water passage 13b. The first cooling water passage 13a allows cooling water heated by cooling an engine 2 to flow into the radiator 11. The second cooling water passage 13b returns the cooling water coming out from the radiator 11 to the engine 2.

A cooling water passage 14 bypasses the radiator 11. The cooling water passage 14 includes a first bypass cooling water passage 24 and a second bypass cooling water passage 25. The first bypass cooling water passage 24 is branched off from the first cooling water passage 13a and connected to an evaporator 91. The second bypass cooling water passage 25 is branched off from the first cooling water passage 13a and connected to a superheater 92 by way of an waste-heat recovery device 22. The first and second bypass cooling water passages 24, 25 join into the bypass cooling water passage 14. This bypass cooling water passage 14 is connected to a thermostat valve 15.

The thermostat valve 15 is, for example, so configured that a piston is incorporated in the center of a container filled with solid wax and an elastic body (rubber). One end of the piston is fixed to an external flange. A valve main body is located outside the container. During a non-operating period, the valve main body is pushed up by a spring to block a passage (inlet port 15b of FIG. 10). When a cooling water temperature in an inlet port 15c increases to a predetermined value, the wax exposed to the cooling water in the inlet port 15c expands to undergo a volumetric change. A pressure produced at this time acts on the piston via the elastic body. Since the piston is fixed to the flange, the container is relatively lowered and the valve main body fixed in the container is opened to form a flow passage. Specifically, the inlet port 15b of FIG. 10 is opened. That is, the above predetermined value is a cooling water temperature (valve opening temperature) when the valve main body is opened. Here, a "temperature sensitive part" of the thermostat valve 15 is a side where the wax is exposed, i.e. on the side of the inlet port 15c.

The heat exchanger 36 of FIG. 1 is formed by integrating the evaporator 91 and the superheater 92 of FIG. 10. Conversely, the evaporator 91 and the superheater 92 are separately provided in FIG. 10. The following description is made with reference to FIG. 10, but similar description (functions and effects) holds also for the circuit configuration of the cooling water passages of FIG. 1.

In FIG. 10, a cooling water passage 91a and a refrigerant passage 91b for heat exchange are adjacently provided in the evaporator 91. A cooling water passage 92a and a refrigerant passage 92b for heat exchange are adjacently provided in the superheater 92. The cooling water having a higher temperature than that introduced to the evaporator 91 is introduced to the superheater 92. The cooling water flowing in the first bypass cooling water passage 24 after coming out from the engine 2 flows into the cooling water passage 91a of the evaporator 91. The cooling water flowing in the second bypass cooling water passage 25 after coming out from the waste-heat recovery device 22 flows into the cooling water passage 92a of the superheater 92. The cooling water coming out from the cooling water passage 91a of the evaporator 91 is returned to the engine 2 after joining the cooling water coming out from the cooling water passage 92a of the superheater 92.

The refrigerant passage 91b of the evaporator 91 is connected to a refrigerant passage 41 and liquid refrigerant discharged from a refrigerant pump 32 is introduced thereto. Due to such a configuration, heat exchange is performed between the liquid refrigerant and the cooling water coming out from the engine 2 in the evaporator 91. As a result, the liquid refrigerant evaporates into gas refrigerant.

This gas refrigerant is introduced to the refrigerant passage 92b of the superheater 92 via a refrigerant passage 93. By this, heat exchange is performed between the gas refrigerant and the cooling water heated in the waste-heat recovery device 22 to increase the temperature and pressure of the gas refrigerant. The gas refrigerant whose temperature and pressure have been increased in this way is supplied to an expander 37 via a refrigerant passage 42.

It should be noted that, in the evaporator 91 and the superheater 92, each passage (cooling water passage 91a, refrigerant passage 91b, cooling water passage 92a, refrigerant passage 92b) is so configured that the refrigerant and the cooling water flow in mutually opposite directions.

The present inventors studied whether or not the evaporator 91 and the superheater 92 could efficiently operate when the evaporator 91 and the superheater 92 were arranged in this way. The content of this study is described below.

<1> Concerning Pressure Losses of the Evaporator 91 and the Superheater 92

Figure 11:
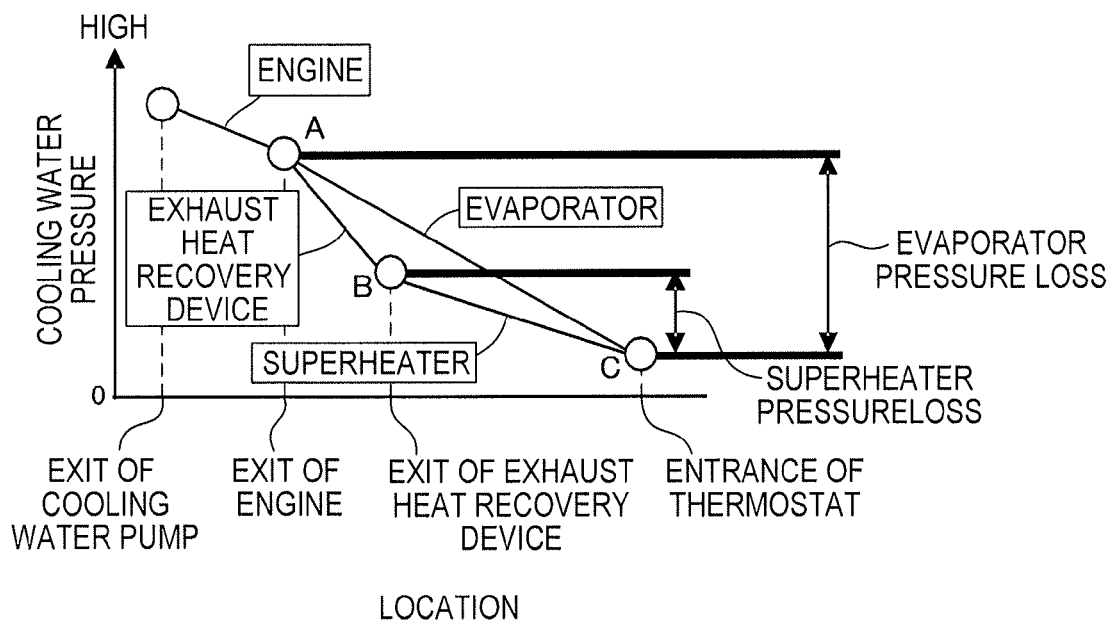
FIG. 11 is a characteristic graph showing a cooling water pressure at each location where cooling water flows.

A horizontal axis of FIG. 11 represents typical locations in the bypass cooling water passages from the exit of a cooling water pump 16 to the entrance of the thermostat valve 15. A vertical axis represents cooling water pressures at those typical locations. A, B and C denote a cooling water pressure at the exit of the engine 2 of FIG. 10, that at the exit of the waste-heat recovery device 22 and that at the entrance (inlet port 15c) of the thermostat valve 15, and these three cooling water pressures A to C are written in FIG. 11.

As is understood from FIG. 11, a pressure difference between the cooling water pressure A at the exit of the engine 2 and the cooling water pressure C at the entrance of the thermostat valve 15 is large in the evaporator 91. The cooling water is easy to flow due to such a large pressure difference. On the other hand, since the superheater 92 is connected in series with the waste-heat recovery device 22, a pressure difference between the cooling water pressure B at the exit of the waste-heat recovery device 22 and the cooling water pressure C at the entrance of the thermostat valve 15 is smaller than the pressure difference in the evaporator 91. Thus, the cooling water is more difficult to flow than in the evaporator. Accordingly, attention needs to be paid in setting pressure losses (water flow resistances) of the evaporator 91 and the superheater 92. In the present embodiment, a pressure loss (water flow resistance) of the superheater 92 connected in series with the waste-heat recovery device 22 is set to be smaller than that of the evaporator 91.

<2> Concerning a Difference Between Heat Transfer Methods of the Evaporator 91 and the Superheater 92

The evaporator 91 adopts boiling heat transfer of boiling the liquid refrigerant by transferring the heat of the cooling water to the liquid refrigerant and has a high heat transfer coefficient. Since the superheater 92 transfers the heat of the cooling water to the gas refrigerant, it has a lower heat transfer coefficient than in the case of heat transfer to the liquid refrigerant. Accordingly, if the same amount of heat is transferred, the size of the evaporator 91 is smaller than that of the superheater 92. To input (transfer) heat to the gas refrigerant in the same manner as to the liquid refrigerant, a heat transfer area of the superheater 92 needs to be larger than that of the evaporator 91. Here, the "heat transfer area" means an area of a part where heat is transferred from the cooling water to the refrigerant in the evaporator 91 and in the superheater 92.

<3> Concerning the Layout of the Evaporator 91 and the Superheater 92

Figure 12:
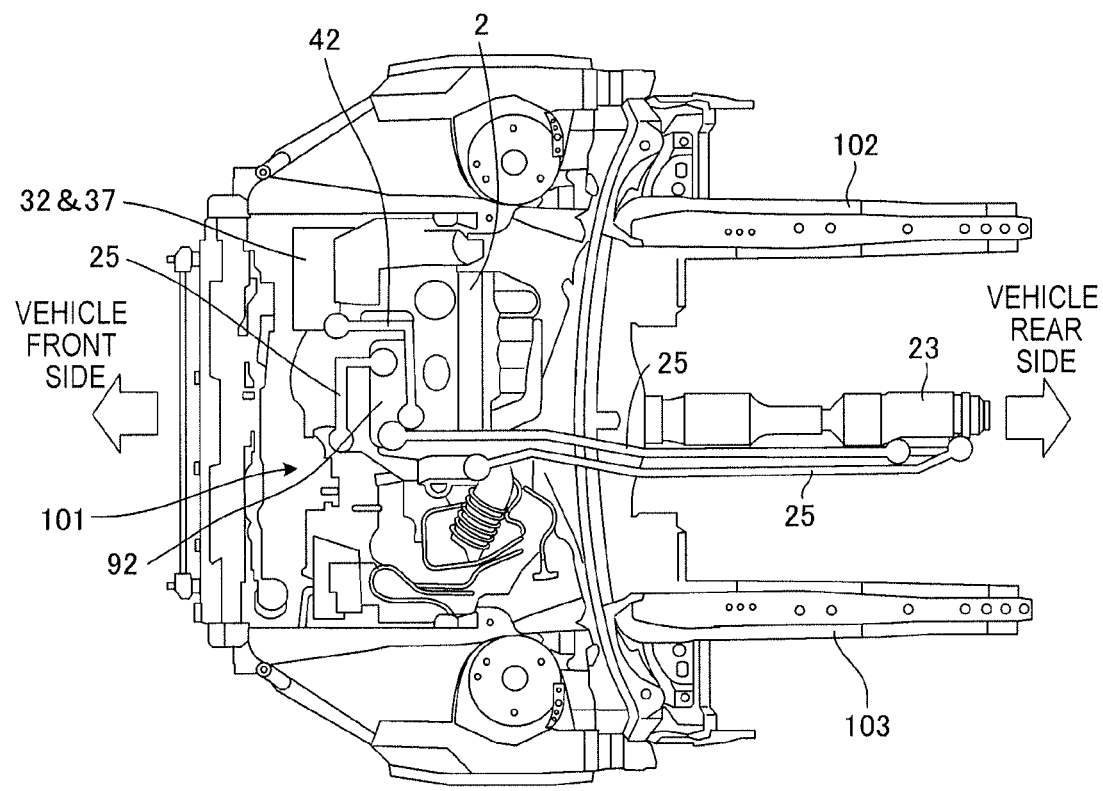
FIG. 12 is a schematic plan view showing a frame of the vehicle and the engine.

FIG. 12 is a schematic plan view showing a frame of a vehicle 1 and the engine 2.

As shown in FIG. 12, an waste-heat recovery unit 23 is located below (between side members 102 and 103) a floor of the vehicle 1. If the superheater 92 is located in an engine compartment 101, the both are largely separated from each other.

To connect the waste-heat recovery device 22 and the superheater 92 by the second bypass cooling water passage 25, it is considered to take out the superheater 92 from the engine compartment 101 and bring it closer to the waste-heat recovery unit 23. By doing so, the second bypass cooling water passage 25 becomes shorter, but the refrigerant passage 42 connecting the superheater 92 and the expander 37 becomes longer. If the refrigerant passage 42 becomes longer, a pressure loss in the refrigerant passage 42 becomes larger.

Then, the refrigerant pressure at the entrance of the expander 37 becomes lower and heat recovery efficiency (cycle efficiency) of the expander 37 drops. Specifically, a reduction in the pressure of the refrigerant that is gas results in a larger loss as the entire system than a reduction in the pressure of the cooling water that is liquid.

Contrary to this, if the superheater 92 can stay in the engine compartment 101, specifically if the superheater 92 is arranged closer to the waste-heat recovery unit 23 than to the evaporator 91 as shown in FIG. 12, the refrigerant passage 42 is short. As a result, the efficiency of the Rankine cycle 31 is enhanced.

As just described, if the evaporator 91 and the superheater 92 are arranged according to the above study results <1> to <3>, the efficiencies of the evaporator 91 and the superheater 92 are good. In the present embodiment, the evaporator 91 and the superheater 92 may be united into the heat exchanger 36 as shown in FIG. 1 to further simplify the configuration.

Next, functions and effects of the present embodiment are described.

According to the present embodiment, the cooling water coming out from the waste-heat recovery device 22 is returned to the engine 2 (see FIG. 10) after being introduced to the superheater 92. Specifically, the cooling water coming out from the superheater 92 is not supplied to the evaporator 91 unlike the Rankine cycle of JP2010-77964A. Specifically, the cooling water coming out from the superheater 92 is returned to the engine 2 without by way of the evaporator 91. Due to such a configuration, a pressure difference between the entrance of the waste-heat recovery device 22 and the exit of the superheater 92 becomes larger than in conventional devices. This enables the cooling water to sufficiently flow to the waste-heat recovery device 22 even if a water pump and a flow rate regulating valve (allocation control means) are not necessarily provided and enables a sufficient amount of heat to be recovered from exhaust gas.

Further, in the Rankine cycle of JP2010-77964A, the cooling water at the exit of the superheater and that at the exit of the engine are joined and this joined cooling water is introduced to the evaporator. Thus, a flow rate of the evaporator is relatively high. This leads to a possibility that the evaporator is enlarged and a heat exchanging performance of the evaporator is sacrificed. Contrary to this, according to the present embodiment, the cooling water after coming out from the two cooling water passages (cooling water passages 91a, 92a) is joined and returned to the engine 2. According to such a configuration, a problem that the evaporator is enlarged and the heat exchanging performance of the evaporator is sacrificed is avoided.

Further, in the Rankine cycle of JP2010-77964A, the evaporator and the superheater are connected in series with the radiator. Contrary to this, according to the present embodiment, the evaporator 91 and the superheater 92 are not connected in series with the radiator 11. According to such a configuration, a pressure loss (water flow resistance) of the cooling water passing through the radiator 11 is smaller as compared with the Rankine cycle of JP2010-77964A. This can increase a heat radiation amount from the radiator 11 by increasing a radiator flow rate. As a result, the radiator 11 can be miniaturized.

Further, according to the present embodiment, the cooling water coming out from the superheater 92 and that coming out from the evaporator 91 flow into the temperature sensitive part of the thermostat valve 15 after joining (see FIG. 10). Due to such a configuration, the thermostat valve 15 is opened when heat reception in the Rankine cycle 31 reaches a limit and the cooling water temperature at the exit of the superheater 92 and at the exit of the evaporator 91 becomes high. As a result, the cooling water cooled in the radiator 11 is supplied to the engine 2. This prevents the overheating of the engine 2.

If the superheater is connected in series with the waste-heat recovery device, a pressure loss in the cooling water passage on the side of the superheater (water flow resistance between the entrance of the waste-heat recovery device 22 and the exit of the superheater 92) increases. Contrary to this, according to the configuration of the present embodiment, the cooling water is not unevenly distributed to the evaporator 91 and the cooling water flow rate of the superheater 92 is ensured since the pressure loss of the supearheater 92 is smaller than that of the evaporator 91.

The evaporator 91 adopts boiling heat transfer (refrigerant side) and has a high heat transfer coefficient and the size of the evaporator 91 is smaller than that of the superheater 92 in the case of transferring the same amount of heat. On the other hand, since the superheater 92 adopts heat transfer by gas (refrigerant side), the heat transfer area of the superheater 92 needs to be larger than that of the evaporator 91 to input heat to the superheater 92 in the same manner as to the evaporator 91. According to the present embodiment, the heat can be input to the superheater 92 in the same manner as to the evaporator 91 since the heat transfer area of the superheater 92 is larger than that of the evaporator 91.

In the present embodiment, the superheater 92 is arranged closer to the evaporator 91 than to the waste-heat recovery unit 23 (waste-heat recovery device 22) (see FIG. 12). Specifically, according to the present embodiment, the refrigerant passage 42 connecting the superheater 92 and the expander 37 is shorter than the second bypass cooling water passage 25 connecting the waste-heat recovery unit 23 (waste-heat recovery device 22) and the superheater 92. If such a configuration is adopted, a pressure loss in the refrigerant passage 42 is smaller as compared with the case where the second bypass cooling water passage 25 is shorter than the refrigerant passage 42. As a result, efficiency deterioration of the Rankine cycle 31 is suppressed.

In the present embodiment, the refrigerant coming out from the refrigerant pump 32 is caused to flow into the evaporator 91 and that coming out from the evaporator 91 is caused to flow into the superheater 92 (see FIG. 10). Specifically, according to the present embodiment, heat can be efficiently input to the refrigerant since heat exchange is first performed using low-temperature cooling water (about 80 to 90° C.) and then performed using high-temperature cooling water (about 110 to 115° C.).

Although the embodiments of the present invention have been described above, the above embodiments are only an illustration of some application examples of the present invention and not intended to limit the technical scope of the present invention to the specific configurations of the above embodiments.

For example, although the case of the hybrid vehicle has been described in the above embodiments, there is no limitation to this. The present invention can be applied also to a vehicle mounted only with the engine 2. The engine 2 may be either a gasoline engine or a diesel engine.

Further, although the refrigerant coming out from the refrigerant pump 32 is introduced first to the evaporator 91 and then to the superheater 92 in the embodiments, the refrigerant coming out from the refrigerant pump 32 may be introduced first to the superheater 92 and then to the evaporator 91.

Further, the waste-heat recovery device for exchanging heat between the cooling water coming out from the engine and the exhaust gas is provided at an intermediate position of the exhaust pipe in the above examples. However, there is no limitation to such a configuration. The waste-heat recovery device may be provided at an intermediate position of an EGR passage or may be used also as an EGR cooler.

The term "cooling water" in the embodiments is used as a concept including antifreeze fluid and long-life coolant in addition to water.

This application claims a priority of Japanese Patent Application No. 2011-216787 filed with the Japan Patent Office on Sep. 30, 2011, all the contents of which are hereby incorporated by reference.

The invention claimed is:

1. A Rankine cycle, comprising:
    an waste-heat recovery device that is configured to exchange heat between cooling water coming out from an engine and exhaust gas exhausted from the engine;
    a heat exchanger including an evaporator through which the cooling water coming out from the engine flows to recover waste-heat of the engine to refrigerant, and a superheater through which the cooling water coming out from the waste-heat recovery device flows to recover the waste-heat of the engine to the refrigerant;
    an expander that is configured to generate power using the refrigerant coming out from the heat exchanger;
    a condenser that is configured to condense the refrigerant coming out from the expander; and
    a refrigerant pump that is configured to supply the refrigerant coming out from the condenser to the heat exchanger by being driven by the expander;
    wherein the cooling water coming out from the superheater is returned to the engine after being joined with the cooling water coming out from the evaporator.

2. The Rankine cycle according to claim 1, comprising:
    a first cooling water passage that is configured to supply the cooling water heated by cooling the engine to a radiator;
    a second cooling water passage that is configured to return the cooling water coming out from the radiator to the engine;
    a bypass cooling water passage including a first bypass cooling water passage branched off from the first cooling water passage and bypassing the radiator and a second bypass cooling water passage branched off from the first cooling water passage, bypassing the radiator and joining the first bypass cooling water passage, and joining the second cooling water passage after the first bypass cooling water passage and second bypass cooling water passage join; and
    a thermostat valve provided in a junction part of the bypass cooling water passage with the second cooling water passage and including a temperature sensitive part on the side of the bypass cooling water passage;
    wherein:
    the evaporator is provided in the first bypass cooling water passage; and
    the superheater is provided in the second bypass cooling water passage.

3. The Rankine cycle according to claim 1, wherein:
    a pressure loss of the superheater is smaller than that of the evaporator.

4. The Rankine cycle according to claim 1, wherein:
    a heat transfer area of the superheater is larger than that of the evaporator.

5. The Rankine cycle according to claim 1, wherein:
    the superheater is arranged closer to the evaporator than to the waste-heat recovery device.

6. The Rankine cycle according to claim 1, wherein:
the refrigerant coming out from the refrigerant pump flows into the superheater by way of the evaporator.

* * * * *